(12) United States Patent
Riordan

(10) Patent No.: US 7,562,214 B2
(45) Date of Patent: Jul. 14, 2009

(54) DATA PROCESSING SYSTEMS

(75) Inventor: James F. Riordan, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 10/811,177

(22) Filed: Mar. 26, 2004

(65) Prior Publication Data

US 2005/0022026 A1    Jan. 27, 2005

(30) Foreign Application Priority Data

Mar. 31, 2003    (EP)    ................................. 03007223

(51) Int. Cl.
*H04L 9/00*    (2006.01)
(52) U.S. Cl. ........................... 713/164; 726/23; 726/24; 726/25; 711/113; 711/216
(58) Field of Classification Search ................. 713/1–2, 713/153–154, 168, 171, 179, 182–184, 187–189, 713/194, 19; 726/2–4, 17–18, 21–27, 30, 726/34; 709/223–225; 380/1, 201, 228–229, 380/239, 255, 259, 32, 42, 277, 28–30, 282–286, 380/37
See application file for complete search history.

(56) References Cited

U.S. PATENT DOCUMENTS

| | | | | |
|---|---|---|---|---|
| 5,977,824 | A * | 11/1999 | Sparks | ........................... 330/2 |
| 5,991,399 | A * | 11/1999 | Graunke et al. | ............. 380/279 |
| 6,209,091 | B1 * | 3/2001 | Sudia et al. | .................. 713/175 |
| 6,457,021 | B1 * | 9/2002 | Berkowitz et al. | .......... 707/201 |
| 6,578,144 | B1 | 6/2003 | Gennaro et al. | ............. 713/176 |
| 6,985,901 | B1 * | 1/2006 | Sachse et al. | .................. 707/10 |
| 7,020,645 | B2 * | 3/2006 | Bisbee et al. | .................. 707/1 |
| 7,043,641 | B1 * | 5/2006 | Martinek et al. | ............ 713/187 |

(Continued)

OTHER PUBLICATIONS

Digital signature and Public Key Crptosystem in a Prime Order Subgroup of Z_n*, in proceedings of ICICS'97, LNCS vol. 1334, by C. Boyd, Springer-Verlag, 1997, pp. 346-355.

(Continued)

*Primary Examiner*—Kimyen Vu
*Assistant Examiner*—Leynna T Truvan
(74) *Attorney, Agent, or Firm*—Scully, Scott, Murphy & Presser, P.C.; Kenneth R. Corsello, Esq.

(57) ABSTRACT

Detection of an attack on a data processing system. An example method comprising, in the data processing system: providing an initial secret; binding the initial secret to data indicative of an initial state of the system via a cryptographic function; recording state changing administrative actions performed on the system in a log; prior to performing each state changing administrative action, generating a new secret by performing the cryptographic function on a combination of data indicative of the administrative action and the previous secret, and erasing the previous secret; evolving the initial secret based on the log to produce an evolved secret; comparing the evolved secret with the new secret; determining that the system is uncorrupted if the comparison indicates a match between the evolved secret and the new secret; and, determining that the system in corrupted if the comparison indicate a mismatch between the evolved secret and the new secret.

17 Claims, 6 Drawing Sheets

U.S. PATENT DOCUMENTS

| | | | |
|---|---|---|---|
| 7,117,376 B2 * | 10/2006 | Grawrock | 380/277 |
| 7,139,915 B2 * | 11/2006 | DeTreville | 713/172 |
| 7,158,953 B1 * | 1/2007 | DeMello et al. | 705/51 |
| 7,178,025 B2 * | 2/2007 | Scheidt et al. | 713/168 |
| 7,181,017 B1 * | 2/2007 | Nagel et al. | 380/282 |
| 7,225,244 B2 * | 5/2007 | Reynolds et al. | 709/223 |
| 7,236,956 B1 * | 6/2007 | Ogg et al. | 705/50 |
| 7,266,818 B2 * | 9/2007 | Pike et al. | 717/176 |
| 7,302,709 B2 * | 11/2007 | England et al. | 726/27 |
| 7,343,493 B2 * | 3/2008 | Challener et al. | 713/193 |
| 7,380,278 B2 * | 5/2008 | Ellison et al. | 726/26 |
| 7,398,389 B2 * | 7/2008 | Teal et al. | 713/164 |
| 7,409,546 B2 * | 8/2008 | Platt | 713/165 |
| 7,415,620 B2 * | 8/2008 | England et al. | 713/193 |

OTHER PUBLICATIONS

On the Security of Some Variants of the RSA Signature Scheme, Computer Security—ESORICS '98, LNCS vol. 1485, by, M. Michels, M. Stadler and H.-M. Sun, Springer-Verlag, 1998, pp. 85-96.

* cited by examiner

DATA PROCESSING SYSTEMS

FIELD OF INVENTION

The present invention is directed to data processing systems. More particularly, it is directed to systems, methods and apparatus for introducing security measures to data processing systems.

BACKGROUND OF THE INVENTION

A data processing system typically comprises a central processing unit (CPU), an input/output (I/O) subsystem, and a memory subsystem, all interconnected by a bus subsystem. The memory subsystem typically comprises random access memory (RAM), read only memory (ROM), and one or more data storage devices such as hard disk drives, optical disk drives, and the like. The I/O subsystem typically comprises: a display; a printer; a keyboard; a pointing device such as a mouse, tracker ball, or the like; and one or more network connections permitting communications between the data processing system and one or more similar systems and/or peripheral devices via a data communications network. The combination of such systems and devices interconnected by such a network may itself from a distributed data processing system. Such distributed systems may be themselves interconnected by additional data communications networks. In the memory subsystem is stored data and computer program code executable by the CPU. The program code includes operating system software and application software. The operating system software, when executed by the CPU, provides a platform on which the application software can be executed. The operating system software has a core or kernel of code in which the basic functions of the operating system software are defined.

A problem associated with data processing systems is that of security. In particular, it is becoming increasingly difficult to determine with any degree of certainty that a data processing system actually has the properties it is believed to have. This difficulty arises because data processing systems, and particularly the operating systems therein, are becoming increasingly general purpose, configurable, and reconfigurable in nature. The administrative state of a data processing systems can be varied from one moment to the next based on an administrative action. Specifically, the administrative state of a data processing system is defined by the combination of software and data present in the machine. The software may include binary files, patches, applications, and the like added to and deleted from the system from time to time via one or more administrative actions. An administrative action such as the addition or deletion of software in the system can thus be regarded as a change in the state of the system. Many data processing systems can be placed into a corrupt state by users and/or system administrators with or without proper authorization. This form of corruption is difficult to detect. It would be desirable to make such corruption easier to detect.

Many data processing networks employ intrusion detection and diagnosis (IDD) systems. These IDD systems are typically data processing systems resident on the network and dedicated to intrusion detection and diagnosis. It will be appreciated that detection of corruption is important in the field of IDD. Most intruders do not want to be detected. Thus, administration tools employed in IDD systems are among the first to be attacked. Cracker tools allow hackers, crackers, or other attackers to selectively hide files, processes, and network connections in an individual host data processing system. An example of a conventional cracker tool is known as "rootkit". Rootkit replaces Unix system commands used for investigation, such as ls, ps, netstat, and ifconfig, with so-called Trojan horse versions that hide the activities of an attacker. Conventionally, such Trojan horses have been identified by calculating, storing, and comparing databases of cryptographic checksums of system binaries. However, recent versions of "rootkit" include Trojan horse versions of the programs employed to generate and compare the checksums. Attackers have recently begun to employ loadable kernel modules to introduce Trojan horses to data processing systems. A kernel is difficult to inspect when running. Thus, Trojan horse modules therein remain undetected. A typical defense against such Trojan horse modules is to prevent kernel modules from being loaded. However, system functionality is then limited.

There is growing interest in releasing computer software in source code form under "open source" licenses such as the "General Public License" and the like. Such releases facilitate creation of Trojan horses, particularly when the software in question is operating system software. The detection of Trojan horses is therefore of increasing importance. IDD systems are an early target for infiltration by Trojan horses. Here, the attacker typically alters the IDD system in such a manner that it appears to continue functioning normally, but in reality hides the attacker's activities.

Conventional security schemes for data processing systems include secure logging schemes and forward secrecy of digital signatures.

Secure logging schemes are directed to the protection of integrity, secrecy, and authenticity of records of data processing events. The schemes may be employed in maintaining quality standards of event logging. In general, secure logging schemes assume the existence of a secure logging host data processing system and operate in dependence on a combination of message or stream encryption, hash chaining, authentication codes, and one way key evolution.

Forward secrecy of digital signatures is directed to limiting damage to compromised signature keys. In operation, forward secrecy of digital signatures provides a series of signing keys:

$$SK_0 \Rightarrow SK_1 \Rightarrow SK_2 \Rightarrow$$

So that $SK_{n+1}$ is a derivation of $SK_n$, and that verification of a signature does not require distribution, traversal, and verification of a chain of keys.

SUMMARY OF THE INVENTION

In accordance with the present invention, there is now provided systems apparatus and methods for detecting an attack on a data processing system. An example method comprising, in the data processing system: providing an initial secret; binding the initial secret to data indicative of an initial state of the system via a cryptographic function; recording state changing administrative actions performed on the system in a log; prior to performing each state changing administrative action, generating a new secret by performing the cryptographic function on a combination of data indicative of the administrative action and the previous secret, and erasing the previous secret; evolving the initial secret based on the log to produce an evolved secret; comparing the evolved secret with the new secret; determining that the system is uncorrupted if the comparison indicates a match between the evolved secret and the new secret; and, determining that the system in corrupted if the comparison indicate a mismatch between the evolved secret and the new secret.

From another aspect, there is now also provided a data processing system comprising: a processor; a memory connected to the processor; and, detection logic connected to the processor and the memory, the detection logic, in use: providing an initial secret; binding the initial secret to data indicative of an initial state of the system via a cryptographic function; recording state changing administrative actions performed on the system in a log; prior to performing each state changing administrative action, generating a new secret by performing the cryptographic function on a combination of data indicative of the administrative action and the previous secret, and erasing the previous secret; evolving the initial secret based on the log to produce an evolved secret; comparing the evolved secret with the new secret; determining that the system is uncorrupted if the comparison indicates a match between the evolved secret and the new secret; and, determining that the system in corrupted if the comparison indicate a mismatch between the evolved secret and the new secret.

The present invention advantageously also provides methods for cryptographic entangling of state and administration in a data processing system that permits detection of Trojan horses within the system.

BRIEF DESCRIPTION OF THE DRAWINGS

The invention and its embodiments will be more fully appreciated by reference to the following detailed description of advantageous and illustrative embodiments in accordance with the present invention when taken in conjunction with the accompanying drawings, in which.

DETAILED DESCRIPTION OF THE INVENTION

Figure 1:
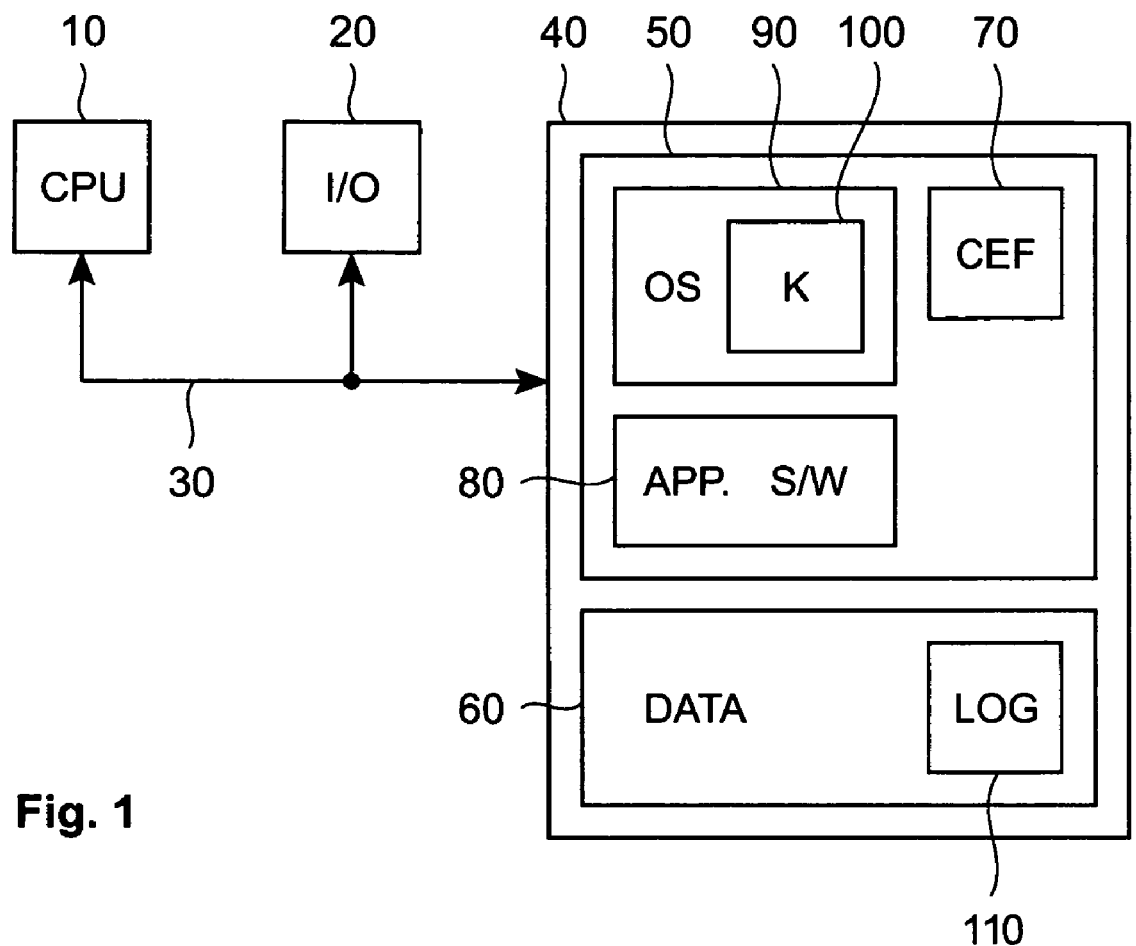
FIG. 1 shows a block diagram of an example of a data processing system embodying the present invention.

The present invention provides methods, systems and apparatus for detecting an attack on a data processing system. An example method comprising, in the data processing system: providing an initial secret; binding the initial secret to data indicative of an initial state of the system via a cryptographic function; recording state changing administrative actions performed on the system in a log; prior to performing each state changing administrative action, generating a new secret by performing the cryptographic function on a combination of data indicative of the administrative action and the previous secret, and erasing the previous secret; evolving the initial secret based on the log to produce an evolved secret; comparing the evolved secret with the new secret; determining that the system is uncorrupted if the comparison indicates a match between the evolved secret and the new secret; and, determining that the system in corrupted if the comparison indicate a mismatch between the evolved secret and the new secret. The term 'in the system' as used herein, includes elements peripheral to the system but coupled thereto directly or indirectly.

The cryptographic function advantageously comprises a one-way hash function. The hash function may comprise an exponentiation function. In an advantageous embodiment of the present invention, the cryptographic function comprises a public/private key pair. The initial secret may be received from a system administrator.

Viewing the present invention from another aspect, there is now provided a data processing system comprising: a processor; a memory connected to the processor; and, detection logic connected to the processor and the memory, the detection logic, in use: providing an initial secret; binding the initial secret to data indicative of an initial state of the system via a cryptographic function; recording state changing administrative actions performed on the system in a log; prior to performing each state changing administrative action, generating a new secret by performing the cryptographic function on a combination of data indicative of the administrative action and the previous secret, and erasing the previous secret; evolving the initial secret based on the log to produce an evolved secret; comparing the evolved secret with the new secret; determining that the system is uncorrupted if the comparison indicates a match between the evolved secret and the new secret; and, determining that the system in corrupted if the comparison indicate a mismatch between the evolved secret and the new secret.

The present invention also extends to a computer program element comprising computer program code means which, when loaded in a processor of a computer system, configures the processor to perform the aforementioned attack detection method.

The present invention advantageously provides a method for cryptographic entangling of state and administration in a data processing system that permits detection of Trojan horses within the system.

In an advantageous embodiment of the present invention, an initial secret is evolved in a data processing system in an irreversible manner. The evolution progresses based on administrative actions in the system. As the evolution progresses, previous secrets are overwritten. Proof of knowledge of the evolved secret thus equates to a cryptographic verification of the history of administrative action in the system. Thus, if the initial state of the system is known, the current state can be determined. If the initial state is known to have been an uncorrupted state, then an absence of subsequent corruption can be proved. It can then be determined that the system remains uncorrupted.

In a particularly advantageous embodiment of the present invention, the aforementioned cryptographic entangling has initialization, update, and proof stages. In the initialization stage, the system generates an initial secret and releases binding data that binds to the secret. The binding data may take different forms depending on application.

In the update stage, the system updates the secret each time there is an administrative action that could lead to system corruption such as infiltration of system level Trojan horses. Examples of such corruption actions include: updating of system executable code; updating of system libraries; installation of kernel modules; reading of files such as those used to store system states during rebooting operations; alteration of configuration files; alteration of system run-level codes; and, writing to or reading from peripheral devices. Each update proceeds in the following manner. First, a new secret is computed by applying a one way function to the combination of the previous secret, a description of the action, and associated context information. Then, the previous secret and any information from which it might be derived is completely overwritten or otherwise erased. A description of the action is then logged. Finally the action is performed.

In the proof stage, the system offers a proof that its current secret corresponds to the initial secret as it has evolved according to the record of logged actions.

Referring first to FIG. 1, a data processing system comprises a CPU 10, an I/O subsystem 20, and a memory subsystem 40, all interconnected by a bus subsystem 30. The memory subsystem 40 may comprise random access memory (RAM), read only memory (ROM), and one or more data storage devices such as hard disk drives, optical disk drives, and the like.

The I/O subsystem 20 may comprises: a display; a printer; a keyboard; a pointing device such as a mouse, tracker ball, or the like; and one or more network connections permitting communications between the data processing system and one or more similar systems and/or peripheral devices via a data communications network. The combination of such systems and devices interconnected by such a network may itself form a distributed data processing system. Such distributed systems may be themselves interconnected by additional data communications networks.

In the memory subsystem 40 is stored data 60 and computer program code 50 executable by the CPU 10. The program code 50 includes operating system software 90 and application software 80. The operating system software 90, when executed by the CPU 10, provides a platform on which the application software 80 can be executed. The operating system software 90 has a core or kernel 100 of code in which the basic functions of the operating system software 90 are defined.

In an advantageous embodiment of the present invention, the program code 50 stored in the program code 50 stored in the memory subsystem 40 also includes detector logic comprising a cryptographic entangling facility (CEF) 70. The CEF 70 is associated with a log file 110 also stored in the memory subsystem 40. The CEF 70 may be separate from the operating system software 90 as shown or embedded in the operating system software 90. In a particularly advantageous embodiment of the present invention, the CEF 70 is embedded in the kernel 100 of the operating system software 90.

In operation, the CEF 70 entangles the state and administration of the data processing system in a cryptographic manner. The entangling permits detection of Trojan horses and the like within the system.

As indicated earlier, the administration of the data processing system includes administrative actions such as the addition, deletion, or other reconfiguration of the program code 50 and data 60 recorded in the memory subsystem 40. Each administrative action effectively changes the data processing system from one state to another.

The cryptographic entangling is developed based on an initial secret. The secret is evolved by the CEF 70 in an irreversible manner. The evolution of the secret progresses in steps. Each step corresponds to and is triggered by a change in state of the data processing system. Whenever an administrative action is to be performed in the data processing system, producing a change of state in the data processing system, there is a corresponding and preceding step in the evolution of the secret. At each step, the CEF 70 overwrites or otherwise deletes the previous secret from the memory subsystem 40. The CEF 70 produces a new secret based on the previous secret together with data indicative of the corresponding administrative action. The new secret is recorded by the CEF 70 in place of the previous secret. The administrative action is then performed. Proof of knowledge of the evolved secret thus equates to a cryptographic verification of the history of administrative action in the data processing system. Thus, if the initial state of the system is known, the current state can be determined. If the initial state is known to have been an uncorrupted state, then an absence of subsequent corruption can be proved. It can then be determined that the system remains uncorrupted.

Figure 2:
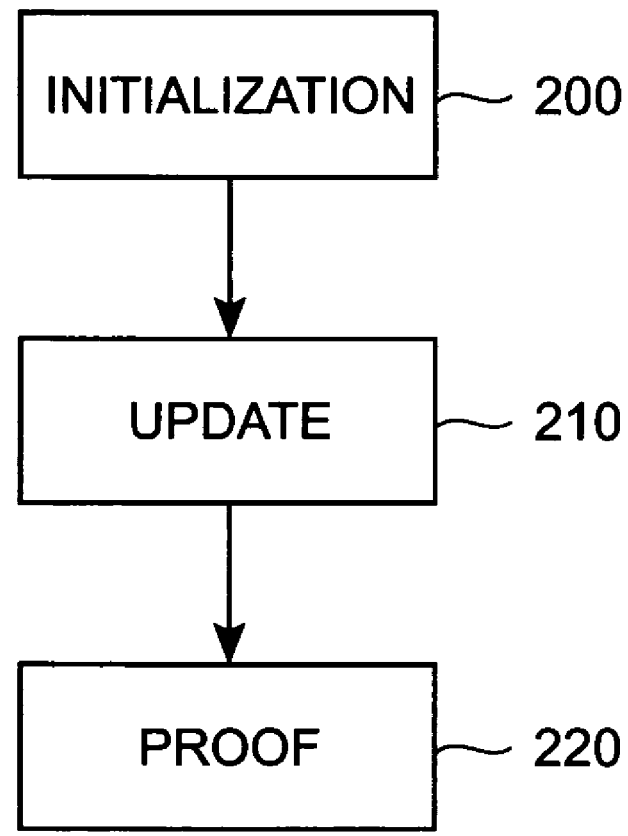
FIG. 2 is a flow diagram associated with the data processing system.

Referring now to FIG. 2, in advantageous embodiments of the present invention, the cryptographic entangling has an initialization stage 200, an update stage 210, and a proof stage 220.

Figure 3:
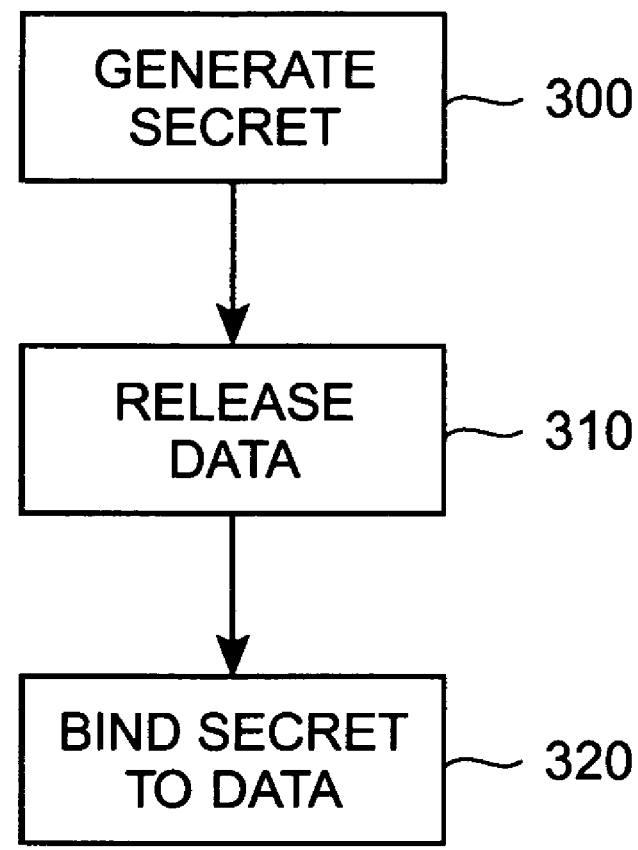
FIG. 3 is another flow diagram associated with the data processing system.

Referring to FIG. 3, in the initialization stage 200, the CEF 70, at step 300 generates an initial secret. The initial secret is supplied a system administrator via a secure communication channel. Alternatively, in other embodiments of the present invention, the initial secret may be entered to the CEF 70 by the system administrator. At step 310, the CEF 70 releases binding data. At step 320, the CEF 70 binds the binding data to the secret. The binding data may take different forms depending on the data processing system, the or each application of the data processing system, and trust mechanisms associated with communication of the secret.

Figure 4:
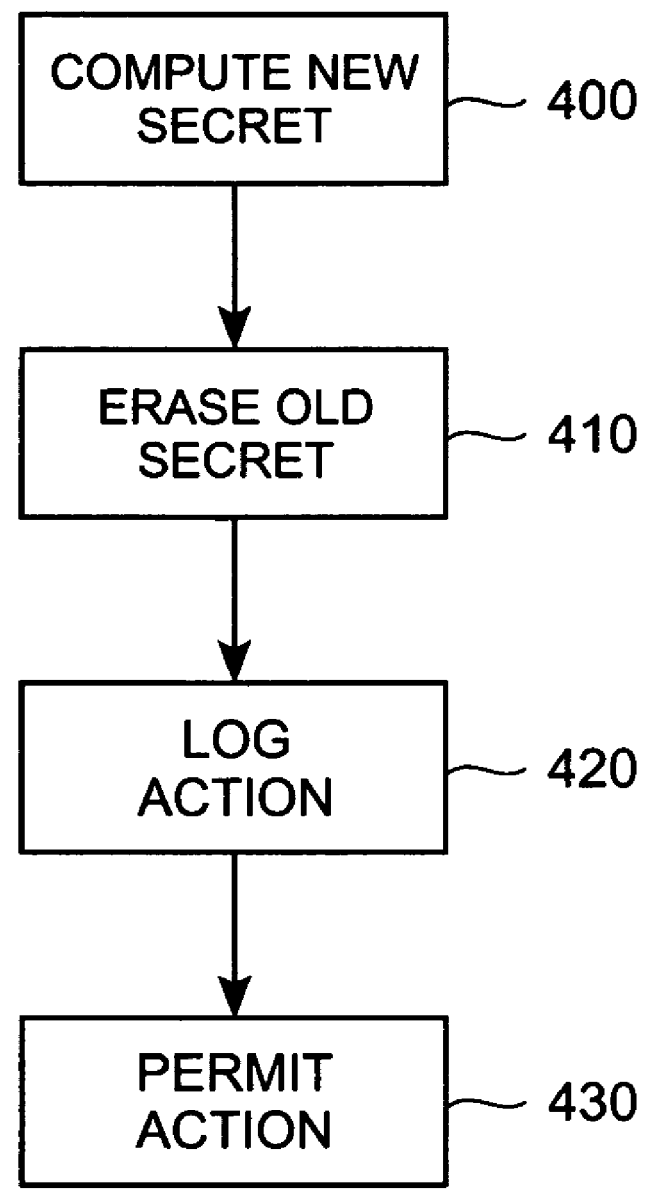
FIG. 4 is yet another flow diagram associated with the data processing system.

Referring to FIG. 4, in the update stage 210, the CEF 70 updates the secret each time there is an administrative action. Specifically, the update is triggered by and performed is advance of administrative action. As indicated earlier, examples of such actions include: updating of system executable code; updating of system libraries; installation of kernel modules; reading of files such as those used to store system states during rebooting operations; alteration of configuration files; alteration of system run-level codes; and, writing to or reading from peripheral devices. Each update proceeds in the following manner. First, at block 400, the CEF 70 computes a new secret. The new secret is computed by the CEF 70 applying a one way function to the combination of the previous secret and data indicative of the administrative action. At block 410, the CEF 70 erases the previous secret, together with any information from which it might be derived. At block 420, the CEF 70 records data indicative of the administrative action in the log file 110. At block 430, the CEF 70 permits execution of the administrative action.

Figure 5:
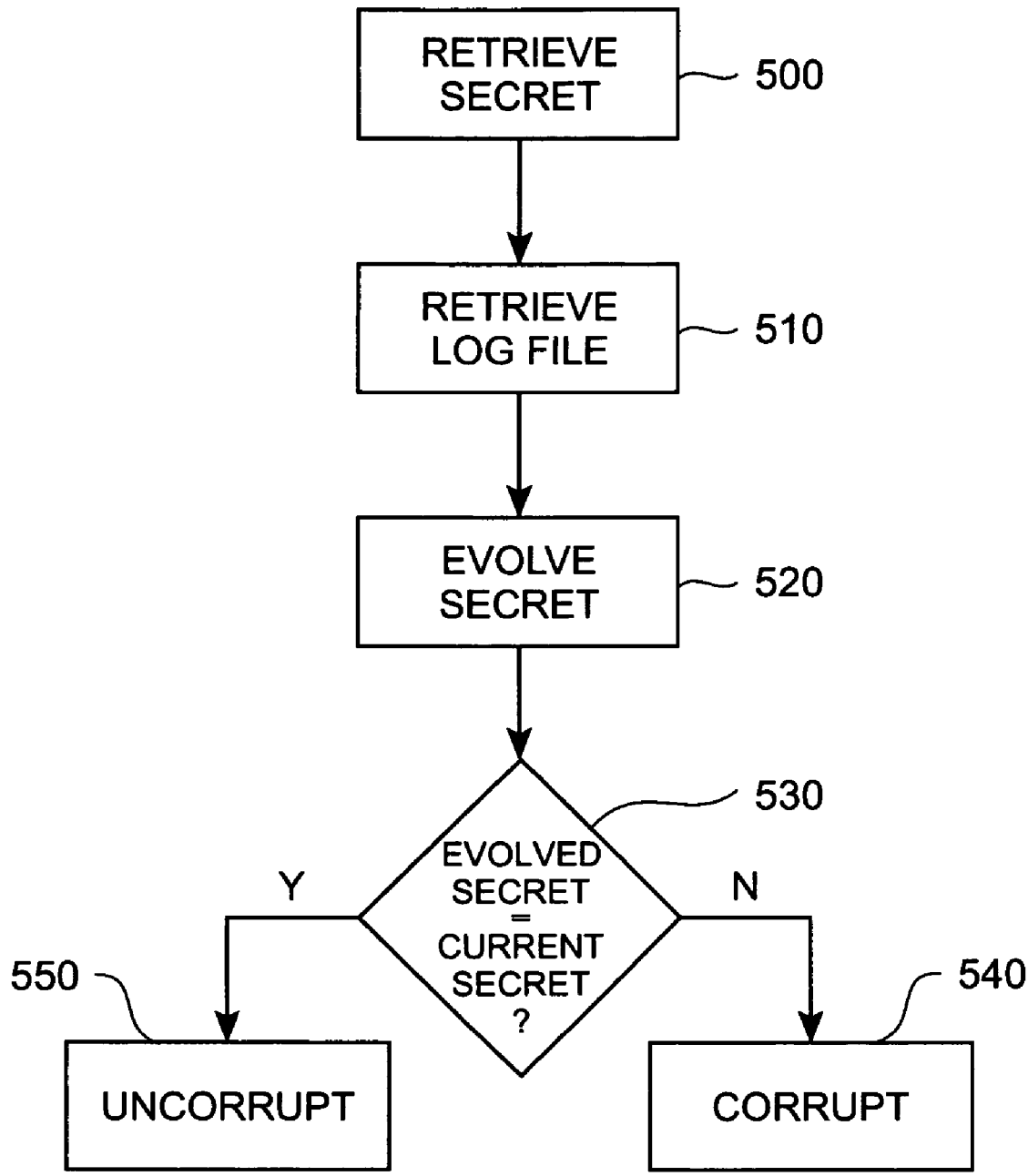
FIG. 5 is a further flow diagram associated with the data processing system; and, FIG. 6 is a block diagram of a data processing system in a layer format.

With reference to FIG. 5, in the proof stage 220, the CEF 70 offers a proof that its current secret corresponds to the initial secret as it has evolved according to the record of actions contained in the log file 110. Specifically, at block 500, the CEF 70 retrieves the initial secret. The initial secret may be retrieved, for example, via a request for entry of the initial secret by a system administrator. At block 510, the CEF 70 retrieves the record of administrative actions from the log file 110 stored in the memory subsystem 40. At block 520, the CEF 70 evolves the initial secret based on the record of administrative actions retrieved from the log file 110. At block 530, the CEF 70 compares the secret evolved in block 520 with its current secret. If the secrets match, then, at block 550, the CEF 70 reports that the data processing system is still in an uncorrupted state. If however the secrets do not match, then, at block 540, the CEF 70 reports that the data processing system is in a potentially corrupted or otherwise compromised state.

The operation of the CEF 70 in a particularly advantageous embodiment of the present invention will now be described. In the following explanation, an ordered collection of administrative actions in the data processing system is denoted by $\{M_i\}$, where i is an index. The index may for example be time. However, such it will appreciated that intervals between successive administrative actions may be irregular. The secret known by the CEF 70 at i is $S_i$. $P(S_i)$ is data that provably binds the data processing system to the secret $S_i$. During the initialization stage 200, the CEF 70 chooses secret $S_0$ and releases data $P(S_0)$. As indicated earlier, the form of release depends on application. In the update stage 210, the secret $S_i$ is updated according to the mapping $(S_n, M_n) \Rightarrow S_{n+1}$. The mapping $(S_n, M_n) \Rightarrow S_{n+1}$ is a one way collision resistant cryptographic hash function such as MD-5 or SHA-1. Collision resistance in this context implies that the pair $S_n$ and $S_{n+1}$ together provide a binding to administrative action $M_n$. The evolution can thus be represented by:

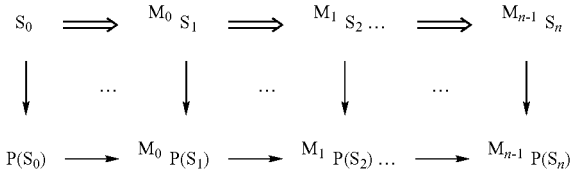

Where the mapping $P(S_n) \rightarrow P(S_{n+1})$ is an indication that an administrator can verify that data $P(S_{n+1})$ is derived from data $P(S_n)$ according to administrative action $M_n$.

In an advantageous embodiment of the present invention, the initial secret is shared between the data processing system and the administrators of the data processing system, as indicated earlier. The computational overhead associated with this arrangement is advantageously low. However, this arrangement also assumes that all the administrators are benign. At the initialization stage 200, the initial secret $S_0$ is generated by the CEF 70 and provided via a secure communications channel to the administrators. In the update stage 210, the CEF 70 employs a collision resistant cryptographic hash function $\hbar$ to update the secret, as follows:

$$S_{n+1} = \hbar(\text{"Update"}, S_n, M_n)$$

"Update" is a text word included in each update to avoid spoofing attacks.

In the proof stage 220, an administrator supplies the index t to the CEF 70. In response, the CEF 70 returns $\hbar(S_n, t)$. The initial secret $S_0$ is known to administrator. In addition, the history of administrative actions $\{M_n\}$ is recorded in the log file 110. $S_n$ can thus be computed. Because $\hbar$ is collision free, it is possible to conclude that the data processing system knows $S_n$.

In another advantageous embodiment of the present invention, public key encryption is employed. This has an advantage in that the administrators of the data processing system need not trust one another. In the initialization stage 200, the CEF 70 generates a public/private key pair and publishes the public key.

In the update stage 210, CEF 70 generates, for each administrative action, a new public/private key pair. The CEF 70 then signs the combination of the new key and data indicative of the administrative action $M_n$ with the previous key. The CEF 70 records both the signature and the signed data in the log file. The CEF 70 then erases the old private key. Only then does the CEF 70 permit the data processing system to perform the administrative action.

In the proof stage 220, the administrator supplies index t. In response, the CEF 70 then signs the combination of t with the current public key. The history of administrative actions $\{M_n\}$ is known. Therefore, the chain of signatures can be verified. Therefore, the current public key can be computed. The ability of the CEF 70 to sign a user influenced message demonstrates that the CEF 70 knows the private key. Thus, the state of the data processing system can be confirmed.

Another advantageous embodiment of the present invention involves large prime numbers. In the initialization stage 200, the CEF 70 chooses two large prime numbers $p_1, p_2$. The CEF 70 also chooses an element g of high order in the group $G = (Z/p_1 p_2 Z)^x$. The CEF 70 picks x where random $X \in [1, p_1 p_2]$. In addition, the CEF 70 sets $S_0 = g^x$. The CEF 70 further picks y where random $y \in [1, p_1 p_2]$. The CEF 70 publishes $g^{xy}$, g, y, and the product $p_1 p_2$. The CEF 70 thus binds the data processing system to $g^x$.

In the update stage 210, the CEF 70 generates new secrets based on $S_{n+1} = (S_n)^{\hbar(n,M_n)} \cdot g$. This operation is effectively one way as it is difficult to take roots in the group G. Multiplication by g is added to avoid degenerately small subgroups.

In the proof stage 220, the administrator supplies t. In response, the CEF 70 returns $(S_n)^2 \hbar(t)$. The history of administrative actions $\{M_n\}$ is known from the log file 110. Modular exponentiation inside the group G can be performed. The CEF 70 can compute $(S_n^y)^2 \hbar(t)$ by mimicking the updates and computations that have been performed using $g^{xy}$ rather than the system value of $g^x$. The value returned raised to the power y can be verified.

Yet another particularly advantageous embodiment of the present invention involves Sophie-Germain prime numbers. In the initialization stage 200, the CEF 70 chooses two Sophie-Germain prime numbers $p_1, p_2$. The CEF 70 also chooses an element g in the group $G = (Z/p_1 p_2 Z)^x$ with a large prime order greater than the maximum of the hash function $\hbar(\cdot)$. In addition, the CEF 70 chooses random $x \in [1, p_1 p_2]$. The CEF 70 also chooses random $y \in [1, p_1 p_2]$. The CEF 70 sets $S_0 = g^x$. In addition, the CEF 70 publishes $g^{xy}$, g, y, and the product $p_1 p_2$. In the update stage 210, the CEF 70 generates new secrets based on $S_{n+1} = (S_n)^{\hbar(n,M_n)}$. As indicated earlier, it is difficult to take roots in the group G. Thus, $S_{n+1} = (S_n)^{\hbar(n,M_n)}$ is effectively one way. Because $\hbar(n, M_n) < \text{order}(g)$, no entropy is lost. Degenerate subgroups are thus avoided. The proof stage 220 here is similar to that described in the preceding example.

Figure 6:
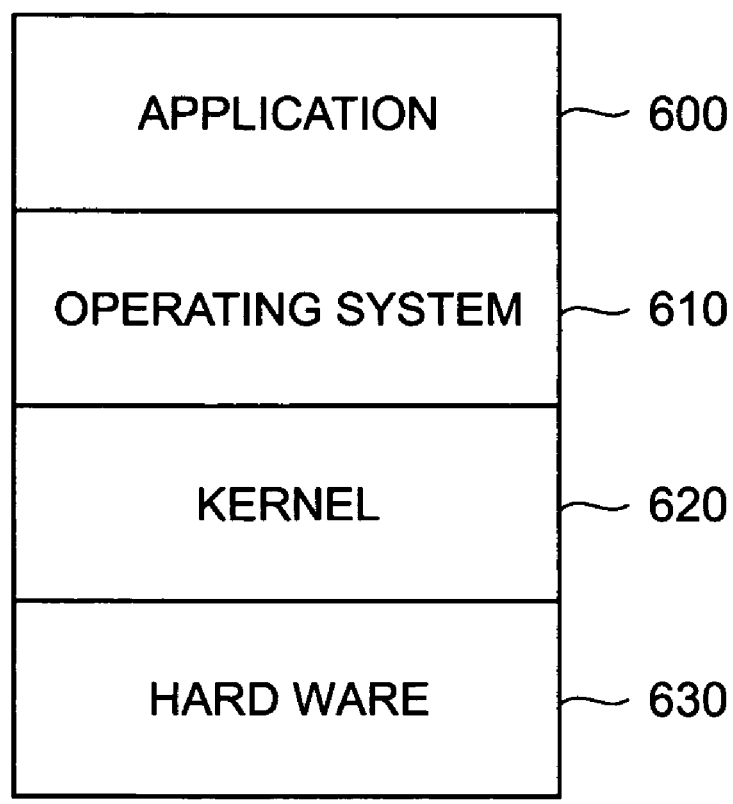

With reference now to FIG. 6, a data processing system as herein before described with reference to FIG. 1 can be represented as a stack of data processing layers 600-630. Each layer in the stack forms a foundation of processing for the next layer in ascending order. At the base level, there is the hardware layer 630 comprising the CPU 10, and logic circuitry of the I/O subsystem 20, memory subsystem 40, and bus subsystem 30. Beyond the hardware layer is the kernel layer 620, comprising the kernel 100. Beyond the kernel layer 620 is the operating system layer, comprising the remainder of the operating system 90. On the operating system 90 is the application 600, comprising the application software 80. Other stacked subdivisions of the data processing system may be apparent to those skilled in the art. In general, embodiments of the present invention may be installed in one or more of the data processing layers 600-630. Each installation then protects the layer in which it is hosted from corruption.

In the examples of the present invention herein before described, all administrative actions producing a change in state of the data processing system trigger an update of the secret. However, in other embodiments of the present invention, only a subset of such actions may trigger an update of the secret. For example, only actions potentially leading to infiltration of system level Trojan horses may trigger an update of the secret.

Also, in the advantageous embodiments of the present invention herein before described, the CEF 70 is implemented by computer program code executing on the CPU 10 of the data processing system. It will be appreciated that, in other embodiments of the present invention, the CEF 70 may be implemented at least partially by hardwired logic circuitry. In particularly advantageous embodiments of the present invention, the CEF 70 may be embedded in a trusted subsystem of the data processing system.

Variations described for the present invention can be realized in any combination desirable for each particular application. Thus particular limitations, and/or embodiment enhancements described herein, which may have particular advantages to the particular application need not be used for all applications. Also, not all limitations need be implemented in methods, systems and/or apparatus including one or more concepts of the present invention.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for detecting an attack on a data processing system installed on a kernel layer, the method comprising, in the data processing system installed on the kernel layer:

providing, at the kernel layer, an initial secret;

binding, at the kernel layer, the initial secret to data indicative of an initial state of the system, which is installed on the kernel layer between a hardware layer and an operating system layer, via a collision resistant cryptographic function;

recording, at the kernel layer, state changing administrative actions performed on the system in a log, the state changing administrative actions comprising one or more of: an installation of kernel modules and an alternation of system run-level codes;

prior to performing each state changing administrative action, at the kernel layer, generating a new secret by performing the collision resistant cryptographic function on a combination of data indicative of the administrative action and the previous secret, erasing the previous secret, and recording the new secret in a place of the previous secret;

evolving, at the kernel layer, the initial secret based on the log to produce an evolved secret;

comparing, at the kernel layer, the evolved secret with the new secret;

determining, at the kernel layer, that the system is uncorrupted if the comparison indicates a match between the evolved secret and the new secret; and determining, at the kernel layer, that the system is corrupted if the comparison indicates a mismatch between the evolved secret and the new secret, wherein the cryptographic function comprises a one-way hash function and the hash function comprises an exponentiation function.

2. The method as claimed in claim 1, wherein the cryptographic function comprises a public/private key pair.

3. The method as claimed in claim 1, further comprising: receiving the initial secret from a system administrator.

4. A data processing system, which is installed on a kernel layer, comprising:

a processor;

a memory connected to the processor; and detection logic connected to the processor and the memory, the detection logic, in use:

providing, at the kernel layer, an initial secret;

binding, at the kernel layer, the initial secret to data indicative of an initial state of the system, which is installed on the kernel layer between a hardware layer and an operating system layer, via a collision resistant cryptographic function;

recording, at the kernel layer, state changing administrative actions performed on the system in a log, the state changing administrative actions comprising one or more of: an installation of kernel modules and an alternation of system run-level codes;

prior to performing each state changing administrative action, at the kernel layer, generating a new secret by performing the cryptographic function on a combination of data indicative of the administrative action and the previous secret, erasing the previous secret, and recording the new secret in a lace of the revious secret;

evolving, at the kernel layer, the initial secret based on the log to produce an evolved secret;

comparing, at the kernl layer, the evolved secret with the new secret;

determining, at the kernel layer, that the system is uncorrupted if the comparison indicates a match between the evolved secret and the new secret; and determining, at the kernel layer, that the system is corrupted if the comparison indicate a mismatch between the evolved secret and the new secret, wherein the cryptographic function comprises a one-way hash function and the hash function comprises an exponentiation function.

5. The system as claimed in claim 4, wherein the cryptographic function comprises a public/private key pair.

6. The system as claimed in claim 4, wherein the detection logic receives the initial secret from a system administrator.

7. A computer program element comprising computer program code means which, when loaded in a processor of a computer system, configures the processor to perform a method as claimed in claim 1.

8. A program storage device readable by machine, tangibly embodying a program of instructions executable by the machine to perform method steps for detecting an attack on a data processing system, said method steps comprising the steps of claim 1.

9. A computer program product comprising a computer usable medium having computer readable program code means embodied therein for causing a data processing system, the computer readable program code means in said computer program product comprising computer readable program code means for causing a computer to effect the functions of claim 4.

10. A method for cryptographic entangling of state and administration in a data processing system installed on a kernel layer, the method comprising:

initializing the system, which is installed on the kernel layer between a hardware layer and an operating system layer, by generating an initial secret releasing binding data;

binding, at the kernel layer, the binding data to the initial secret via a collision resistant cryptographic function;

updating, at the kernel layer, the initial secret in advance of an administrative action by computing a new secret, the administrative action comprising one or more of: an installation of kernel modules and an alternation of system run-level codes;

erasing, at the kernel layer, the initial secret together with any information from which the initial secret might be derived;

recording, at the kernel layer, the new secret in a place of the initial secret;

recording, at the kernel layer, data indicative of the administrative action;

permitting, at the kernel layer, execution of the administrative action; and offering, at the kernel layer, a proof that the new secret corresponds to the initial secret as it has evolved according to a record of administrative actions, wherein the cryptographic function comprises a one-way hash function and the hash function comprises an exponentiation function.

11. The method as recited in claim 10, wherein the step of offering retrieves the initial secret via a request for entry of the initial secret by a system administrator, retrieving the record of administrative actions previous stored; and evolving a candidate secret for the initial secret based on the record of administrative actions retrieved;

comparing the candidate secret with a current secret;

if the candidate secret matches the current secret, reporting that the data processing system is still in an uncorrupted state, and if the candidate secret does not match the current secret, reporting that the data processing system is in a potentially compromised state.

12. The method as recited in claim 10, further comprising permitting detection of any Trojan horse within the system.

13. The method as recited in claim 10, wherein the initial secret is supplied via a secure communication channel.

14. The method as recited in claim 10, wherein the binding data takes different forms depending on an application of the data processing system, and a trust mechanisms associated with communication of the initial secret.

15. The method as recited in claim 10, wherein the step of computing the new secret includes applying a one way function to a combination of a previous secret and data indicative of the administrative action.

16. The method as recited in claim 1, wherein a proof of knowledge of the evolved secret equates to a cryptographic verification of a history of the administrative actions.

17. The method as recited in claim 4, wherein a proof of knowledge of the evolved secret equates to a cryptographic verification of a history of the administrative actions.

* * * * *